United States Patent
Sellier et al.

(10) Patent No.: US 8,402,315 B2
(45) Date of Patent: Mar. 19, 2013

(54) ELECTRONIC CARD ABLE TO EXECUTE A COMMAND ORIGINATING FROM A SIMULATION SYSTEM AND A COMMAND ORIGINATING FROM A DIAGNOSTIC MODULE AND ASSOCIATED SIMULATION METHOD

(75) Inventors: Gregory Sellier, Toulouse (FR); Thierry Habigand, Tournefeuille (FR); Franck Dessertenne, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/666,528

(22) PCT Filed: Aug. 28, 2008

(86) PCT No.: PCT/IB2008/002242
§ 371 (c)(1),
(2), (4) Date: Jun. 15, 2010

(87) PCT Pub. No.: WO2009/001218
PCT Pub. Date: Dec. 31, 2008

(65) Prior Publication Data
US 2010/0257407 A1    Oct. 7, 2010

(30) Foreign Application Priority Data

Jun. 28, 2007 (FR) ...................... 07 56129
Aug. 31, 2007 (FR) ...................... 07 57293

(51) Int. Cl.
*G06F 11/00* (2006.01)
*G06F 11/30* (2006.01)
(52) U.S. Cl. ................ 714/33; 714/27; 714/29; 714/40; 703/13

(58) Field of Classification Search ............ 714/37, 714/38, 27, 29, 31, 33, 40; 703/13, 17, 20, 703/19, 21, 22
See application file for complete search history.

(56) References Cited

U.S. PATENT DOCUMENTS

| | | | | |
|---|---|---|---|---|
| 5,023,791 A | * | 6/1991 | Herzberg et al. | 701/35 |
| 5,111,402 A | * | 5/1992 | Brooks et al. | 701/35 |
| 5,260,874 A | * | 11/1993 | Berner et al. | 701/33 |
| 5,546,562 A | * | 8/1996 | Patel | 703/14 |

(Continued)

FOREIGN PATENT DOCUMENTS

| | | |
|---|---|---|
| EP | 0 683 463 A2 | 11/1995 |
| JP | 2006 048402 | 2/2006 |

OTHER PUBLICATIONS

Aidemark, J. et al., "A Framework for Node-Level Fault Tolerance in Distributed Real-Time Systems", International Conference on Dependable Systems and Networks, Total pp. 10 (Jun. 28, 2005) XP010817841.

*Primary Examiner* — Joseph Schell
(74) *Attorney, Agent, or Firm* — Oblon, Spivak, McClelland, Maier & Neustadt, L.L.P.

(57) ABSTRACT

An electronic card (4) comprising a processing unit (7), able to receive a command originating from a diagnostic module (6) and a command originating from a simulation system (3). The electronic card (4) comprises means of managing the execution priority of the command originating from the simulation system (3) relative to the command originating from the diagnostic module (6). A diagnostic system of an electronic card comprising a diagnostic module and means of managing the execution priority of the commands. A simulation method is associated with the electronic card (4). For use in particular for analysing malfunctions on electronic cards (4) incorporated in integration simulators (1).

15 Claims, 1 Drawing Sheet

U.S. PATENT DOCUMENTS

| | | | |
|---|---|---|---|
| 5,764,953 A * | 6/1998 | Collins et al. | 703/17 |
| 5,812,824 A * | 9/1998 | Dearth et al. | 703/14 |
| 7,047,176 B2 * | 5/2006 | Klevans et al. | 703/21 |
| 7,392,431 B2 * | 6/2008 | Swoboda | 714/28 |
| 7,685,470 B2 * | 3/2010 | Ayrignac et al. | 714/38.13 |
| 2003/0191615 A1 * | 10/2003 | Bailey et al. | 703/13 |
| 2004/0216100 A1 * | 10/2004 | Bower, III | 718/100 |
| 2005/0143177 A1 | 6/2005 | Takeda et al. | |
| 2008/0066077 A1 | 3/2008 | Bower, III | |

* cited by examiner

ELECTRONIC CARD ABLE TO EXECUTE A COMMAND ORIGINATING FROM A SIMULATION SYSTEM AND A COMMAND ORIGINATING FROM A DIAGNOSTIC MODULE AND ASSOCIATED SIMULATION METHOD

This invention relates to electronic cards.

The invention particularly relates to electronic cards used in integration simulators, especially in simulators for equipment items of an aircraft.

BACKGROUND OF THE INVENTION

Correlatively it relates to a diagnostic system for electronic cards.

Integration simulators are used to ensure the development and integration of the on-board electronic and computer systems in aircraft, in particular prior to the first flight.

Integration simulators essentially comprise a host computer (known under the name of "host"), real equipment items of the aircraft and an electronic interface connecting these two elements.

The electronic interface comprises several electronic cards, making it possible to place the equipment items of the aircraft in real situations, such as, for example, certain weather conditions, breakdown conditions . . . .

This interface generates or acquires signals managed by the host computer intended for the simulation of real equipment items.

To accomplish this, the host computer comprises simulation models of the aircraft and its environment. Peripheral systems are connected to the real equipment items and comprise verification programs.

An integration simulator is a real time system, which amounts to saying that tests on the equipment items are conducted at the speed of their real functioning.

For this reason, when a malfunction in the electronic cards is detected, it is necessary to step the operation of the integration simulator in order to find exactly where the malfunction is located.

Thus, in order to find the origin of the malfunction, test equipment items, such as a logic analyzer on a real time bus that connects the host computer and the electronic cards, and a multimeter or an oscilloscope on the inputs/outputs of the electronic cards must be set up.

As a result of the stoppage of real time functioning of the integration system, the malfunction is not always visible, and thus it is difficult to find where it is located.

It then is necessary to test the card or cards in dedicated proving benches once the card or cards is/are removed from the integration simulator assembly.

There also is a system that can be connected to certain electronic cards allowing the configuration of the parameters of the cards or the reading of certain memory addresses.

This system transmits diagnostic commands in order to analyze the functioning of the electronic card and in this way to find the malfunction.

Nonetheless, for the same reasons as above, this connection and these diagnostic operations performed on the cards with the aid of the module are performed outside of real time functioning of the integration simulation system.

These methods for finding the malfunction in electronic cards are not very efficient and involve a waste of time because of the complexity of these methods.

On the other hand, when the execution of programs for simulation of the real equipment items is set up and it is wished to modify the value of certain parameters, it is necessary to stop the simulation, modify the simulation programs and restart the simulation.

Considering the long time necessary for the implementation of these programs, this manner of proceeding is inefficient.

SUMMARY OF THE INVENTION

This invention has as an object to remedy the aforementioned limitations and to propose an electronic card making it possible to execute a command originating from a diagnostic module and a command originating from a simulation system in real time.

To this end, the present invention, according to a first aspect, applies to an electronic card comprising a processing unit.

The electronic card is able to receive a command originating from a diagnostic module and a command originating from a simulation system, and comprises means for managing the execution priority of the command originating from the simulation system in relation to that of the command originating from the diagnostic module.

In this way, it is possible to execute a command originating from the diagnostic module or a command originating from the simulation system without stopping, respectively, the real time execution of a command originating from the simulation system or of a command originating from the diagnostic module.

According to a preferred characteristic, the management means are able to bring about the execution of the command originating from the simulation system with priority over the execution of the command originating from the diagnostic module.

In this way, the execution of a command originating from the diagnostic module does not disrupt the real time execution of a command originating from the simulation system.

According to another preferred characteristic, the command originating from the simulation system is preemptive in relation to the command originating from the diagnostic module.

Consequently, on the occasion of the arrival of a command originating from the simulation system in the course of execution of a command originating from the diagnostic module, the card interrupts execution of the command originating from the diagnostic module and immediately begins execution of the command originating from the simulation system.

In practice, the electronic card comprises means for storing the command originating from the diagnostic module on the electronic card during execution of the command originating from the simulation system and means for execution of the command originating from the diagnostic module once execution of the command originating from the simulation system is concluded.

Thus, when a command originating from the simulation system is in the course of execution and a command originating from the diagnostic module arrives, the latter is stored in a memory installed in the electronic card and waits for execution of the command originating from the simulation system to be concluded, to be executed in turn.

For example, the command originating from the diagnostic module is a command for forcing a value of a parameter of the electronic card.

Thus, commands originating from the simulation system and from the diagnostic module can be executed with forced values, in order to be able to conduct analyses and investigations.

As a variant, the command originating from the diagnostic module comprises a function of recording a value of a parameter.

In fact, it is advantageous, during the analysis or investigation, to know the values of certain parameters.

Advantageously, commands originating from the diagnostic module are implemented by a non-priority basic task.

In this way, a basic task detects the end of execution of the command originating from the simulation system and then proceeds to execution of a waiting command originating from the diagnostic module.

In this way, real time execution of the command originating from the simulation system is not disrupted.

According to a second aspect, this invention applies to a diagnostic system of an electronic card.

The diagnostic system comprises a diagnostic module and means for managing the execution priority of a command originating from a simulation system in relation to that of command originating from the diagnostic module.

The diagnostic system of the electronic card thus is able to determine the execution priority of the commands originating from the diagnostic module and from the simulation system without, for all that, stopping the real time execution of the commands.

These means for managing the execution priority of the commands are means for managing the priority of the commands of the electronic card described above.

This diagnostic system has characteristics and advantages similar to those described above in connection with the electronic card.

According to a third aspect, this invention applies to a method for execution of a command originating from a simulation system and of a command originating from a diagnostic module, implemented by an electronic card according to the invention.

This method has characteristics and advantages similar to those described above in connection with the electronic card and therefore they will not all be repeated in the following.

The invention relates to a method for simulation by means of an electronic card of a command originating from a diagnostic module and of a command originating from a simulation system, with a step of managing the execution priority of the command originating from the simulation system in relation to that of the command originating from the diagnostic module.

According to a preferred characteristic, the execution of the command originating from the simulation system has priority in relation to the execution of the command originating from the diagnostic module.

Furthermore, the command originating from the simulation system is preemptive in relation to the command originating from the diagnostic module.

According to a preferred characteristic, the method comprises the following steps:
  storing the command originating from the diagnostic module during execution of the command originating from the simulation system, and
  executing the command originating from the diagnostic module once the command originating from the simulation system is concluded.

For example, the method comprises execution of a command originating from the diagnostic module, the command being a command for forcing a value of a parameter.

As a variant, the method comprises execution of a command originating from the diagnostic module, the command comprising a function of recording a value of a parameter.

According to another preferred characteristic, the command originating from the diagnostic module is implemented by a basic non-priority task.

This invention also applies to the use of the electronic card and of the execution method in accordance with the invention for analysis of a malfunction of the electronic card incorporated into an integration simulator.

This invention likewise applies to the use of a diagnostic system for analysis of a malfunction of the electronic card incorporated into an integration simulator.

Furthermore, the integration simulator is an integration simulator for the equipment items of an aircraft.

BRIEF DESCRIPTION OF THE DRAWINGS

In the attached drawings, presented by way of non-limitative examples.

DETAILED DESCRIPTION OF THE INVENTION

Figure 1:
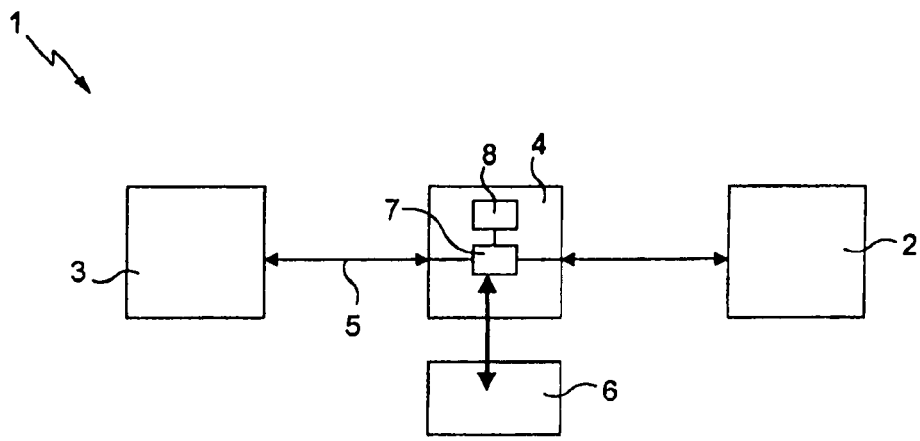
FIG. 1 is a schematic representation of an integration simulator.

An integration simulator comprising a diagnostic system and an electronic card in accordance with the invention is going to be described with reference to FIGS. 1 and 2.

An integration simulator 1 comprises a real equipment item 2, a simulation system 3 and an electronic interface 4 located between them.

A real equipment item 2 is, by way of example, a cockpit of an aircraft, avionic computers, activators for control surfaces or electric and hydraulic generators.

This equipment item 2 is not necessarily a real system intended for an aircraft but it also can be a model used for the design thereof.

Simulation system 3 here is a host computer.

Host computer 3 models the aircraft and its environment, and transmits simulation commands to these equipment items.

Transmission of these commands is carried out, for example, once host computer 3 has transmitted a starting command (intended to start up the functioning of the integration system), as well as a configuration command for the integration system.

Host computer 3 is made up, for example, of servers with a high computing capacity.

A server used is, for example, the server known under the reference "alpha server ES45" designed by the company Hewlett Packard.

Electronic interface 4 comprises electronic cards making it possible to place the equipment items of an aircraft in real situations, during simulation of the signals transmitted by host computer 3 intended for simulation of real equipment items 2.

By way of example, these cards are ARINC 429 or AFDX type cards.

Electronic interface 4 is connected to the host computer by means of a high-speed bus 5.

At the same time, the bus connects the electronic cards to each other.

By way of example, the bus is a bus known under the name VME ("Versa Module Eurocard") which is a standard bus deriving from the industrial sphere. This bus is particularly well adapted for the connection of various electronic cards to host computer 3. It is adapted for the management of inputs/outputs.

When it is seen that one of the cards has a malfunction or it is wished to force the value of certain parameters of the electronic cards, a diagnostic module 6 is connected to electronic card 4.

Diagnostic module 6 is, for example, a personal computer. The connection between diagnostic module 6 and electronic card 4 is implemented, for example, via the serial port RS232 of this computer.

Diagnostic module 6 is adapted for transmitting diagnostic commands 11 with a view to obtaining in return information items on the functioning of electronic card 4, as well as forcing parameter values of electronic cards 4.

In this way, with these diagnostic commands 11, it is possible to analyze the performance of electronic card 4 with a view to finding the malfunction noted during the integration tests of the equipment items or during the design phase of the equipment items.

Electronic card 4 comprises a microprocessor 7 and memory 8.

Microprocessor 7 is adapted for executing commands 10, 11 that electronic card 4 receives originating from host computer 3 and from diagnostic module 6.

When commands 10, 11 (originating from host computer 3 and diagnostic module 6) arrive at electronic card 4, they raise an interruption 9a, 9b. These commands 10, 11 have a different priority according to the type of command.

Electronic card 4 is adapted for managing the order of execution of these commands 10, 11.

Thus, when card 4 executes a command 10 originating from host computer 3 and an interruption 9a of the diagnostic module is raised by the arrival of a command 11 originating from diagnostic module 6, or when card 4 executes a command 11 originating from diagnostic module 6 and an interruption 9b of the host computer is raised by the arrival of a command 10 originating from host computer 3, card 4 is adapted for managing these scenarios by a management of the priority of the interruptions according to the origin and the type of the commands.

The diagnostic system thus comprises diagnostic module 6 as well as the means necessary for implementing the management of the priority of interruptions 9a, 9b.

The host computer gives microprocessor 8 of the electronic card time for the execution of commands 10, 11.

By way of illustrative example, this time is 10 ms; the time for execution of a command 10 originating from the host computer is 8 ms; and the time for execution of a command 11 originating from diagnostic module 6 is 2 ms.

This management of priorities by electronic card 4 is going to be described with reference to FIG. 2.

Figure 2:
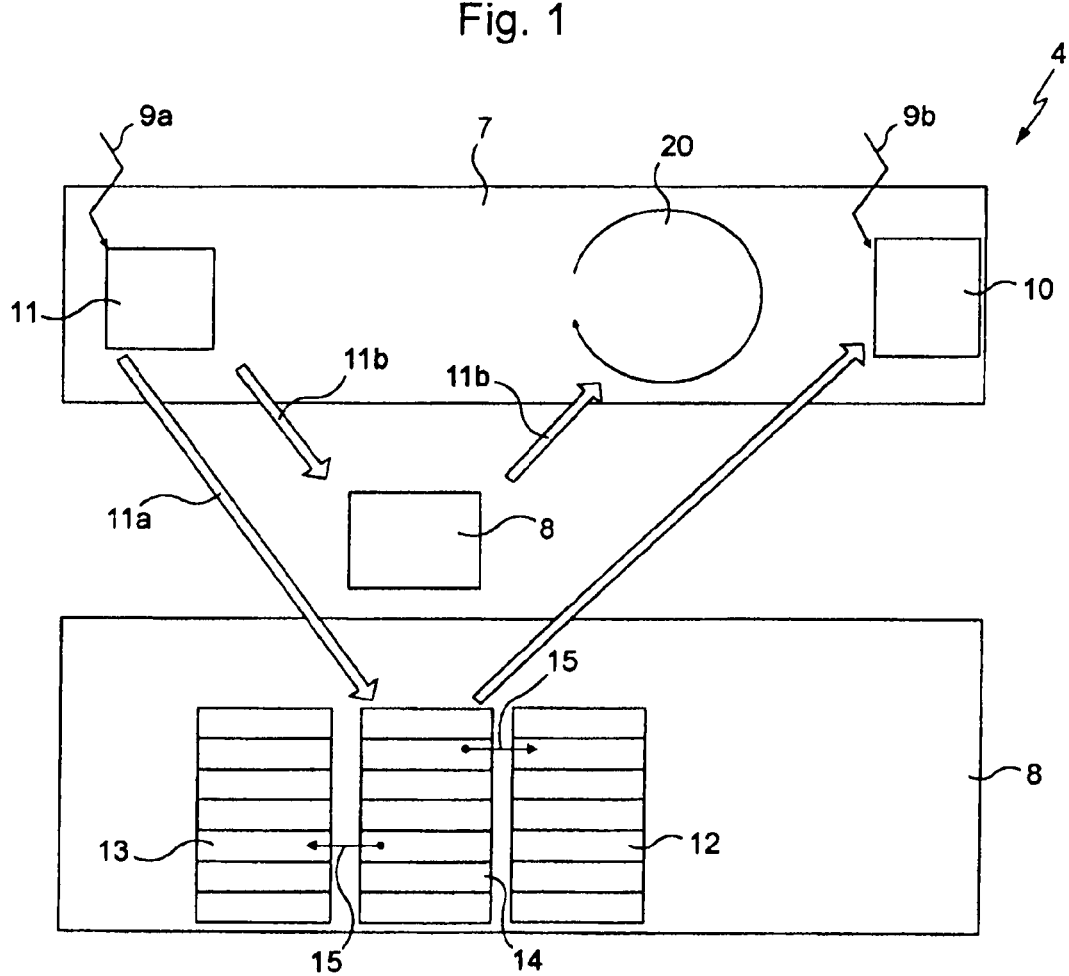
FIG. 2 is a schematic representation of the processing of the commands by an electronic card in accordance with the invention in the integration simulator of FIG. 1.

A microprocessor 7 and memory 8 installed on electronic card 4 are shown on FIG. 2.

As already mentioned in this document, electronic card 4 receives commands 10 originating from host computer 3 and commands 11 originating from diagnostic module 6 that are being executed at the time of interruption 9a, 9b. These interruptions 9a, 9b have different execution priorities.

It will be noted that in this example, commands 10 originating from host computer 3 arrive at the electronic card by VME bus 5 connecting them.

The commands originating from diagnostic module 6 arrive at electronic card 4 by the RS232 serial link between diagnostic module 6 and electronic card 4.

There are different types of commands originating from diagnostic module 6.

The commands originating from diagnostic module 6 contain a binary code representing the type of command and thus making it possible for microprocessor 7 to recognize the type of command 11 that arrived at electronic card 4.

The highest priority is the priority of commands 10 originating from host computer 3. Thus, when a command 10 originating from host computer 3 is being executed in microprocessor 7 and a command 11 originating from diagnostic module 6 arrives, microprocessor 7 continues execution of command 10 originating from host computer 3 and once concluded, it begins execution of command 11 originating from diagnostic module 6.

Commands 10 originating from host computer 3 are preemptive in relation to commands 11 originating from diagnostic module 6.

Thus, when a command 11 originating from diagnostic module 6 is being executed and an interruption 9b is raised by the arrival of a command 10 originating from host computer 3, the execution of command 11 originating from diagnostic module 6 is stopped and command 10 originating from host computer 3 begins to be executed.

In fact, higher priority interruption 9a, 9b is taken into consideration during the processing of another interruption 9a, 9b, but a lower priority interruption 9a, 9b is placed on hold.

Once the execution of command 10 originating from host computer 3 is concluded, command 11 originating from diagnostic module 6 resumes its execution at the point where it was stopped.

When commands 11 originating from diagnostic module 6 arrive at electronic card 4 and microprocessor 7 is occupied with the execution of a command, commands 11 originating from diagnostic module 6 are stored in memory 8 installed on electronic card 4, to await their execution.

This memory 8 is, for example, a volatile memory of FIFO (First In, First Out) type.

Of course, when no command 10 originating from host computer 3 is being executed in microprocessor 7 installed in electronic card 4, and a command 11 originating from diagnostic module 6 arrives, it is not necessary to store the command. The command can be executed directly.

Interruption 9a brought about by commands 11 originating from diagnostic module 6 or diagnostic commands 11 have a priority two.

It will be noted that a priority-two interruption is of lower priority than a priority-one interruption.

When a command 10 originating from host computer 3 is being executed and a diagnostic command 11 arrives, this diagnostic command 11 is stored in installed memory 8. In this way, diagnostic commands 11 are executed by order of arrival on card 4 and therefore by order of storage on memory 8.

Diagnostic commands 11 are executed by a basic task 20. This basic task 20 detects the moments in which microprocessor 7 is inactive and executes diagnostic commands 11 stored in memory 8 awaiting execution.

Here, commands 11 originating from diagnostic module 6 are, in particular, two types.

A first type of diagnostic command 11 is a forcing command 11a (the term forcing also is known by the term "injection").

In this embodiment, forcing command 11a consists in forcing a parameter of electronic card 4 to a value defined in forcing command 11a.

This parameter can be a parameter at input or output of the card, or an intermediate parameter used for internal computations.

Thus, by means of a forcing command 11*a*, it is possible to force output parameters of the card, corresponding to input parameters of real equipment item 2, or else, to input parameters of host computer 3, as well as to force configuration parameters of electronic card 4.

The execution of this forcing command 11*a* can be followed by the execution of a command 10 originating from host computer 3 or of another command 11 originating from diagnostic module 6, In this way, command 10, 11 is executed taking into consideration the forced, and not real, values.

This function is used, for example, when it is wished to analyze a command 10, 11 when the output is set at a value.

It will be noted that during the implementation of forcing command 10*a* on certain input or output parameters of electronic card 4, a command originating from host computer 3 can be implemented at the same time, if this latter command does not use input or output parameters used by forcing command 11*a*.

Obviously, if the command originating from host computer 3 uses the parameters that are going to be forced by forcing command 11*a*, forcing command 11*a* will be implemented only once command 10 originating from host computer 3 is concluded.

This forcing command 11*a* is implemented in the following manner.

Memory 8 installed in electronic card 4 comprises a memory zone including a table containing values of the parameters used by the execution of a command, also called table of real values 12.

Memory 8 also comprises a memory zone including a table reserved for forcing values also called table of forcing values 13.

Finally, the memory comprises a memory zone including a table of pointers 14 used in the execution of the commands.

When a command 11 originating from diagnostic module 6 is a forcing command 11*a*, and once the execution of command 10 originating from host computer 3 is concluded, the forcing values are stored in the table of forcing values 13 and pointer 15 for access to the table of real values 12 then will point to the table of forcing values 13.

In this way, the execution of following command 10, 11 (originating from host computer 3 or from diagnostic module 6) will be implemented with forcing values and not real values.

Once the end of the simulation with forcing values is desired, a command 11 originating from diagnostic module 6 indicating the end of forcing is received.

Thus, the execution of following command 10, 11 (originating from host computer 3 or from diagnostic module 6) will be implemented with real values.

A second type of command 11 originating from diagnostic module 6 comprises a recording function 11*b* for a parameter.

In this embodiment, several types of recording function are possible.

A first type of recording function 11*b* consists in monitoring parameter values acquired by host computer 3 or parameter values sent by the host computer to electronic card 4.

The parameters to be recorded are determined by diagnostic module 6. Diagnostic module 6 associates with the parameter to be recorded an identification label for the recording to be made.

Recording points are provided in the code executed by diagnostic command 11*b*.

Thus, by way of example, when the parameter changes value at a recording point provided in the code, the value of the parameter determined is recorded at that time.

Likewise, it is possible to follow the value of a parameter in time (known by the English term of monitoring).

The parameters to be recorded also are determined by diagnostic module 6 with the aid of identification labels for the recording to be made associated with the parameter to be recorded.

In this case, recording is done periodically.

The recorded values are stored in installed memory 8 of electronic card 4; they then are formatted by basic task 20 and sent to diagnostic module 6.

A second type of recording function 11*b* is the consultation of the configuration parameters of electronic card 4.

A third type of recording function 11*b* is the consultation of functioning states of the electronic card.

These functioning states can be, for example, a state of initialization of the electronic card, a state of implementation of the commands, or an error state.

A fourth type of recording function 11*b* is the consultation of the malfunction states of electronic card 4. This function allows us to find a malfunction and then to investigate what is causing it.

Of course, other types of functions could be implemented by the diagnostic system.

Thus, by virtue of the invention, it is possible to execute a command originating from a diagnostic module without disrupting the real time execution of a command originating from the simulation system.

Consequently, when a malfunction in the electronic card is detected, it is possible to find the origin of the malfunction, without stopping the real time execution of the command originating from the simulation system. In this way, the origin of the malfunction is found rapidly and effectively.

Furthermore, it is possible to force parameter values of the electronic without either stopping or disrupting the real time functioning of the integration simulator.

Of course, many modifications can be made to the exemplary embodiment described above without departing from the context of the invention.

The invention claimed is:

1. An electronic card, comprising:
a processing unit, wherein the processing unit is configured to receive a command originating from a diagnostic module device that is external to the processing unit and a command originating from a simulation system, that is external to the processing unit, in real time, and the processing unit includes means for managing an execution priority of the command originating from the simulation system in relation to that of the command originating from the diagnostic module device, wherein the electronic card is connected to the diagnostic module device and the simulation system.

2. The electronic card in accordance with claim 1, wherein the means for managing are able to bring about execution of the command originating from the simulation system with priority over execution of the command originating from the diagnostic module device.

3. The electronic card in accordance with one of claim 1 or 2, wherein the command originating from the simulation system is preemptive in relation to the command originating from the diagnostic module device.

4. The electronic card in accordance with one of claim 1 or 2, further comprising:
a memory, for storing the command originating from the diagnostic module device, on the electronic card during execution of the command originating from the simulation system; and an execution unit configured to execute the command originating from the diagnostic module device once execution of the command originating from the simulation system is concluded.

5. The electronic card in accordance with one of claim 1 or 2, wherein the command originating from the diagnostic module device is a command for forcing a value of a parameter of the electronic card.

6. The electronic card in accordance with one of claim 1 or 2, wherein the command originating from the diagnostic module device includes a function for recording a value of a parameter.

7. The electronic card in accordance with claim 6, wherein the command originating from the diagnostic module device is implemented by a non-priority basic task.

8. A diagnostic system for an electronic card comprising:
   a diagnostic module; and
   an electronic card according to claim 1.

9. The electronic card in accordance with claim 1, wherein the simulation system models an aircraft and the aircraft's environment, and transmits simulation commands to equipment items of the aircraft.

10. The electronic card in accordance with claim 1, wherein the electronic card is an ARINC 429 or AFDX type card.

11. The electronic card in accordance with claim 1, wherein the electronic card and the diagnostic module device are directly connected by a RS232 serial link.

12. The electronic card in accordance with claim 1, wherein the electronic card and the simulation system are directly connected by a bus.

13. A diagnostic system for an electronic card, the diagnostic system comprising:
   a diagnostic module device that is external to the electronic card; and
   the electronic card including means for managing an execution priority of a command originating from a simulation system, that is external to the electronic card, in relation to that of a command originating from the diagnostic module device, wherein the electronic card is connected to the diagnostic module device and the simulation system.

14. A method for simulation by means of an electronic card, the method comprising:
   executing, by the electronic card, a command originating from a diagnostic module device external to the electronic card and connected to the electronic card and a command originating from a simulation system external to the electronic card and connected to the electronic card; and
   managing an execution priority of the command originating from the simulation system in relation to that of the command originating from the diagnostic module device.

15. The method in accordance with claim 14, further comprising:
   analyzing a malfunction of the electronic card, when the electronic card is incorporated into an integration simulator.

* * * * *